Feb. 23, 1943. G. A. MITCHELL 2,311,769
RANGE CONTROLLED SPEED INDICATOR
Filed Sept. 6, 1941 4 Sheets-Sheet 1

Inventor
GEORGE A. MITCHELL
Attorneys

Feb. 23, 1943. G. A. MITCHELL 2,311,769
RANGE CONTROLLED SPEED INDICATOR
Filed Sept. 6, 1941 4 Sheets-Sheet 4

Inventor
GEORGE A. MITCHELL
Bachelor + Sauntleroy
Attorneys

Patented Feb. 23, 1943

2,311,769

UNITED STATES PATENT OFFICE 2,311,769

RANGE CONTROLLED SPEED INDICATOR

George A. Mitchell, Pasadena, Calif.

Application September 6, 1941, Serial No. 409,825

13 Claims. (Cl. 88—2.7)

My invention refers to devices or instruments for ascertaining relative speeds or velocities existing between two spatially separated objects; as, for instance, between a shore station, or one vessel, and another vessel at sea, or as another instance, as between an airplane and the ground. My invention is useful in any such situation, but the appended detailed description will deal with it in a preferred and typical form as applied and used for the purpose of determining elevations, ground speeds and velocities of aircraft.

One of the general purposes and objects of my invention is to provide an instrument which combines the functions of both a range finder and a speed or velocity indicator, and in which the speed indicator is automatically controlled and set by adjustment of the range finder in such a manner as to automatically cause the speed indicator mechanism to be functionally controlled by the existing range. And, with that object in view, another object and purpose of my invention is to provide an instrumental mechanism of maximum simplicity as regards manufacture and operation. Other objects and purposes and corresponding accomplishments of the invention will appear from a consideration of the following preliminary discussion and the subsequent detailed description of a present typical and preferred form of instrument.

In a typical embodiment of my invention I utilize any suitable type of known range finder instruments. In such instruments the distant object or field is viewed stereoscopically from points located at the ends of a base of fixed length, and the angle between the two lines of view and the distance of the object or field is ascertained by the amount of optical adjustment which is necessary to bring the two images of the distant object or field into coincidence. Various forms of optical adjustment are used in different range finders. The one which I have adopted as being most readily suitable to the purpose of my invention, although I do not limit myself thereto, is of the type which utilizes a compensating wedge prism located in one, or each, of the stereoscopic optical trains, and usually in a position between an objective and its primary focal plane. The wedge prism is moved along the optical axis and its position, when the images are in coincidence, can be calibrated to indicate directly the range of the object or field under observation. For very small angles between the two lines of stereoscopic vision—that is, for such small angles as are usually involved in ascertaining aircraft elevations with an instrument involving a base line suitable for carrying on an aircraft—I find that the adjustment movement of such a wedge prism is substantially, if not exactly, reciprocally related to the elevation.

The instrument of my invention also includes instrumentation whereby any selected point of the object or field under observation, as a point on the ground, may be visually followed as relative movement occurs between the observed point and the instrument. Instrumentation of that general character is in itself of course well known, but, in order to ascertain or indicate actual relative speeds or velocities either the instrumentation itself or its indication must be compensated for the existing range or elevation. In the complete instrument of my invention, the mechanism through which the point following movement is effected is of such a nature that that mechanism can be and is automatically adjusted in compensation for the existing range or altitude as reflected by the adjusted position of the range finding wedge prism. The general result of that automatic compensation is then that the relative speed or velocity can be read directly from the movement of the mechanism which actuates the point-following instrumentation.

In the present preferred form of my invention the mechanism of which I have just spoken comprises a simple cam mechanism which has camming action in two dimensions, one of which is radial of its axis and the other longitudinal of its axis. The movement of the range finding wedge prism automatically moves and adjusts the operating cam mechanism in one of those directions, here shown as the longitudinal direction, and thereby automatically compensates the cam action for range. Once the cam is thus compensated, then its speed of rotation to cause movement of the optical instrumentation to follow the selected point is a direct indication of the relative speed between the instrument and the observed point.

Generally speaking, the rotary speed of the actuating cam mechanism may then be measured in any suitable manner. I prefer to measure angular speed of the cam mechanism by measuring its angular displacement in some selected unit of time, and the finally desired relative speed or velocity can thus, as I will show, be directly calibrated on the rotating cam itself or on some member rotatively connected to it.

There is one other feature to which I desire to call attention in this general discussion of my invention. While the optical instrumentation through which the selected point is observed for speed or velocity indication may be an optical instrumentation separate from that through which the range or elevation is determined, it is one of the features of my complete instrument that these two optical instrumentations may be and are the same. This advantage is effected by arranging the optics of the range finding instrument in such manner that they may be rotated during the following movement, and by applying the actuating cam mechanism to their rotation.

The folowing detailed description is of a merely preferred and illustrative form of my complete instrument, shown in the accompanying drawings in which:

Fig. 2c is an enlarged, fragmentary elevation viewing the device from the position of line 2c—2c on Fig. 2a;

Fig. 6b is a section on line 6b—6b of Fig. 6a;

The instrument may be enclosed in or mounted upon any suitable casing or framework, a suitable casing 10 being here indicated. This casing or framework encloses and supports the rigid structure which establishes the fixed dimension base line for the two spaced prisms 11 and 11a. The usual form of range finder whose principal features I have here adopted, comprises such a rigidly framed base, the two separated prisms, the pair of objectives 12, a central prism element 13 and an ocular 14. Prisms 11 and 11a and objectives 12 and prism element 13 are all located on a common optical axis; the function of prism element 13 is to throw two half images from objectives 12 into the field of ocular 14. In the optical axis inside at least one of the objectives 12 the wedge prism 15 is arranged to be movable along the optical axis to and from the objective. The instrument is initially compensated and adjusted for an object at infinity by some such means as adjusting the position of a wedge prism set 16 external of prism 11. In such an instrument the compensating movement of wedge prism 15 to bring the two half images into co-incidence is substantially or very closely reciprocally related to the altitude of the observed object, at least as long as the angles between the two external optical axes O and $O_1$ are small. Without limiting myself against compensatory corrections for deviations from that simple relationship, I herein treat that relationship as simply reciprocal for the purpose of this description.

Figure 2A:
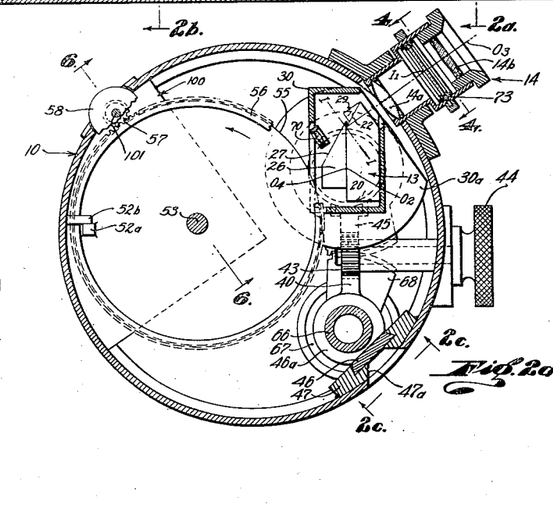
Fig. 2a is an enlarged section taken as indicated by line 2a—2a on Fig. 1.
Figures 3, 4, 5:
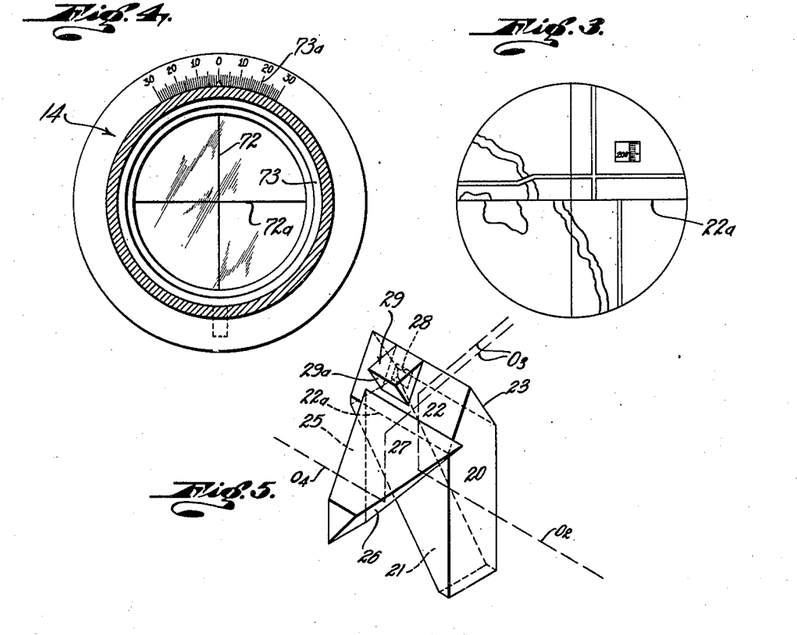
Fig. 3 is a diagram indicating a typical image as viewed through the eye piece of the instrument.
Fig. 4 is an enlarged section taken as indicated by line 4—4 on Fig. 2a, showing the ocular arrangement for determining direction of travel and windage.
Fig. 5 is a diagrammatic perspective of a prefered form of prism element which I use in my instrument.

For certain purposes which I will explain later I utilize a form of prism element at 13 which is best shown in Fig. 5. This prism element is, in itself, well known, and I adopt it both because it gives an image with a sharp line of demarcation between the halves, and because with certain additions the final speed reading of the instrument is shown directly in the field of view of the ocular. Fig. 5 shows the prism diagrammatically. One beam of light from say prism 11a enters on the optical axis $O_2$, passing into the prism through face 20 and being totally reflected at face 21 onto the silvered surface 22, from which it is reflected along the emergent optical axis $O_3$ which is also the axis of ocular 14. The optical axis $O_3$ is normal to the emergent face 23 of the prism. The edge 22a of silvered surface 22 is a sharply defined line and that edge constitutes the line of demarcation between the two image halves which are observed in the ocular. The optical arrangement is such that the image planes of the images from both objectives 12 fall in the plane which is indicated I in Fig. 2a, which plane includes the sharp edge line 22a of reflective surface 22.

The beam of light from the other stereoscopic prism 11 and its objective 12 proceeds on the optical axis $O_4$, entering the prism at face 25, reflected at face 26 onto face 27 where it is again reflected along the optical axis $O_3$, through the emergent face 23, to the ocular.

In the silvered surface 22 I form a clear window 28 through the silvering. Over this window I secure a small glass element 29 which has a surface 29a at right angles to optical axis $O_3$ of the ocular, and through which an image of the final speed indicating calibrations can be viewed, as will be afterwards explained.

Figure 1:
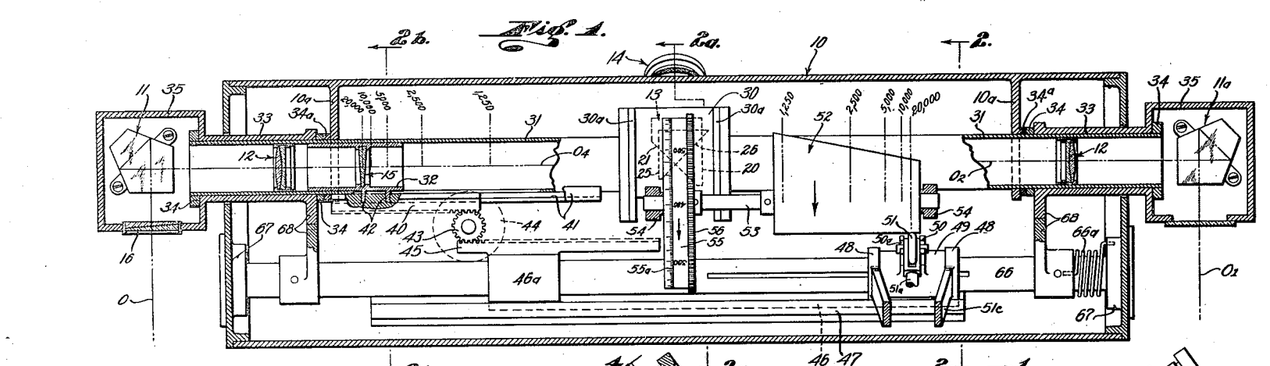
Fig. 1 is a more or less diagrammatic sectional elevation of the instrument (assuming that it is mounted in vertical orientation on an aircraft), the section being taken in the aspect indicated by line 1—1 on Fig. 2, and certain parts being shown in elevation and other parts broken away, as indicated on the line 1a—1a of Fig. 2b, for clarity of illustration.
Figure 2:
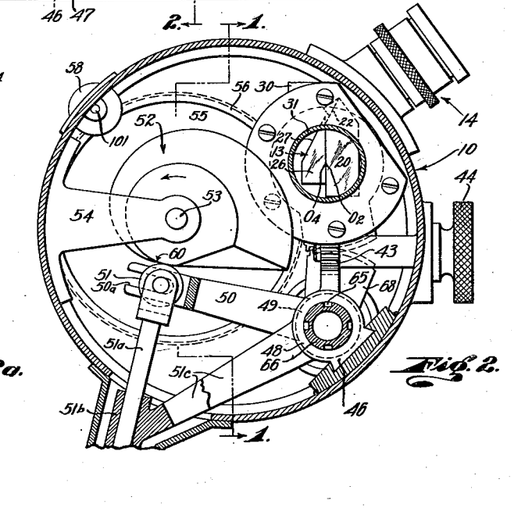
Fig. 2 is an enlarged section taken as indicated by line 2—2 on Fig. 1.

The relative position of the optical axes $O_2$ and $O_4$, viewed endwise, is indicated in Fig. 2. Prism element 13 may be mounted in any suitable structure, as in a box-like structure 30 with end flanges 30a. Tubular elements 31 are secured to the flanges of the box structure and extend in opposite directions along optical axes $O_2$ and $O_4$. At spaced points the tubes 31 are mounted on webs 10a of casing 10, said tubes being held against axial and angular movement with respect to the casing, as will be described. These tubular elements carry the objectives 12 and the one shown at the left in Fig. 1 also carries slider 32 which carries wedge prism 15. At or near their outer ends the tubular elements 31 form bearings for rotative sleeves 33, confined endwise by suitable shoulders such as shown at 34. Spacers 34a between webs 10a and opposing shoulders 34 confine tubes 31 against endwise movement. Sleeves 33 at their outer ends carry the mounting chambers 35 for the two prisms 11 and 11a, the prisms being thus fixedly spaced in the direction of the optical axes $O_2$ and $O_4$, but rotatable about those axes. The structure which has just been described is preferably connected to the main casing only at the two spaced supports of tubes 31, so that distortion of the main external casing or frame will not cause distortion of the parts which carry the optical elements.

A slider 40, sliding in ways 41 on one of the tubes 31, is connected, as by pins 42, with wedge carrying slider 32. Ways 41 coact with the opposite walls 41a of web-slot 41b to prevent rotation of tube 31 with respect to the casing (Fig. 2b). Any suitable means may be utilized for moving slider 40—the means here shown is a pinion 43 operated by hand-wheel 44 and meshing with rack teeth on slider 40. Pinion 43 also meshes with a rack 45 which is mounted on one end 46a of a slider 46 which slides longitudinally in way 47, which is secured to the casing. The other end of slider 46 has projecting fingers 48 which longitudinally confine hub 49 of cam follower arm 50. The arm has slots 50a which take the shaft of cam engaging roller 51, the roller being guided radially of the cam by being mounted on a guide rod 51a that slides in guide 51b which is carried by arms 51c mounted on parts 48 of slider 46. The cam, designated generally by the numeral 52, is mounted on shaft 53 supported in bearing brackets 54 mounted on the main case or frame 10. A calibrated disk 55 is also mounted on cam shaft 53, both cam and disk being rigidly attached to the shaft so as to rotate together. For rotating the cam and disk it is convenient to provide the disk with a ring gear 56 which meshes with a pinion 57 which in turn may be rotated through manual operation of knurled thumb wheel 58.

The general shape and typical contours of the cam are shown in Figs. 1 and 2. The fundamentals underlying its design will be explained later; it is sufficient at this point in the description to note that the cam may be viewed as being made up of an infinite number of spirally contoured cams, each spiral contour starting, at the point marked 60, at a common radius from the axis of the cam, each contour being that of a spiral of uniformly increasing radius, and the rate of radial increment of the several spiral contours increasing in a constant ratio from one end of the cam to the other. The follower arm 50 is set in position longitudinally of the cam by the altitude setting of wedge prism 15. The point marked 60 is the zero or operative starting position of the cam with relation to the cam follower. The arrangement is such, as will be explained, that the rotation of the cam through any predetermined angle from its zero position, swings follower arm 50 through an angle whose tangential function is directly related to the angular rotation of the cam.

Hub 49 of cam follower arm 50 is splined as at 65 to shaft 66 which is supported in suitable bearings 67 in the casing or frame and is rotatively connected with prism supporting sleeves 33 through the intermeshing gear sectors 68. A spring 66a is shown applied to shaft 66 to urge the cam follower into cam engagement. The two prisms 11 and 11a are therefore rotated through angles whose tangents bear a direct relation to the angular movement of cam 52. Consequently, when the apparent movement of the selected object or the field of view is followed by rotating the cam and the prisms 11 and 11a, after the cam follower has been set for the ascertained altitude, the angle through which the cam is rotated in any given time, say six seconds, is a direct measure of the relative speed or velocity which exists between the instrument and the object under observation. Disk 55 therefore may have on its periphery a calibrated scale 55a which reads directly in miles per hour, on the assumption that the disk is rotated for a fixed time, say six seconds, during each of its operations in following the selected object.

It will be readily understood that it is not necessary to swing both prisms 11 and 11a in following the apparent movement of the object or field. It is preferable, for after the images of the two halves of the field have been set in coincidence by the range finding operation, then the whole field appears in the eyepiece to move as a unit. However, the following operations can be performed entirely in one half of the field, if so desired; and it will therefore suffice that only one prism 11, or 11a, (or, more broadly speaking, one line of sight) be swung in following the apparent movement.

Automatic mechanism for stopping, timing and resetting the cam will be explained later. At the end of each object following operation, the operator has an image of scale 55a in the field of view of ocular 14. The arrangement is such that an image of scale 55a is thrown by the small lens 70 into the image plane I, designated in Fig. 2a, and that image of the scale in that plane is then viewed by ocular 14 through the small window 28 in the prism element 13.

Ocular 14 is preferably of a type having a field lens 14a which throws an image from image plane I to an intermediate image plane $I_1$ in which is located the cross-hair or line 72 supported on a rotatable reticule 73. The angular displacement of cross-hair 72 from the vertical is readable on the scale of angles 73a associated with the reticule as shown in Fig. 4. A horizontal cross-hair 72a may be mounted on the same reticule and rotate with cross-hair 72 or it may be mounted to be fixed in a horizontal position; or it may be dispensed with entirely, as it coincides with the line which is formed in the image by the sharp edge 22a of silvered surface 22 of prism element 13. The image in plane $I_1$ is viewed through the eyepiece 14b.

The terms "horizontal" and "vertical," as applied to the lines and cross-hairs seen by the observer at the eyepiece are of course relative. In the instrument designed as here shown and with the observer in such a position with relation to the instrument that the horizontal cross-axis $O_2$, $O_4$ of the instrument extends to his left and right, the line of division between the two half-fields of view, caused by the lower edge of reflective surface 22, and appearing to the observer as the line indicated at 22a in Fig. 3, will appear as a horizontal line. Under those conditions the cross-hair 72 will appear as a vertical line; and if the relative direction of travel, as between the instrument and the observed point, is in a plane at right angles to the cross-axis $O_2$, $O_4$ of the instrument, the apparent travel of the object in the observed field will either be on or parallel to the cross-hair 72 when it is arranged vertically in the field at right angles to line 22a.

I may remark at this point that the whole instrument may be so mounted that it may be turned and adjusted to a position where its axis $O_2$, $O_4$ is normal to the line of relative travel between the instrument and the object under observation. In that case the apparent movement of objects in the observed image will be in what is here defined as the vertical direction parallel to or on cross-hair 72 when it is set vertically to zero on the reticule scale. Under those circumstances and with the instrument so oriented, the reading taken from scale 55a is a true reading of the ground speed of an airplane, regardless of the fact that the plane may not be heading in the direction of its movement with relation to the ground. And also, in that case, the angle to which the instrument is set with relation to the longitudinal axis of the plane gives immediately the angle of drift, and from the angle of drift and the ascertained plane speed the cross windage may be determined On the other hand it may not be necessary for most practical and ordinary purposes to mount the instrument so that its axis is adjustable with relation to the axis of the plane, it being sufficient in many if not most instances to rigidly mount the instrument with its cross axis $O_2$, $O_4$ at right angles to the plane axis. In that case, when following a selected object on the ground for the purpose of determining speed, drift angle and windage, the reticule will be shifted so that cross-hair 72 is alined with the apparent movement of the selected object. However the following movement of the instrument during the rotation of the cam and the separated prisms will be in the relative direction which is here called vertical in the eyepiece field and which coincides with the cross-hair piece 72 when set to zero angle on the reticule scale. Consequently, in such a case, the speed reading which is finally observed on scale 55a will be somewhat less than the actual velocity of the plane with relation to the ground. But for many purposes, and considering the fact that ordinary velocities of air movement over the earth's surface are only a small fraction of the air speeds of present day planes, the discrepancy is more or less negligible. Or if a discrepancy becomes more than negligible the actual ground velocity can readily be deduced by tables or well known simple calculating devices, from the observed reading. The true velocity is equal to the observed speed divided by the cosine of the angle to which cross-hair 72 is set.

From the preceding description of the operation of the device for obtaining the range or altitude and subsequently obtaining relative speed or velocity, it will be understood that it is not necessary that the observer actually know the range or altitude; but a readily readable scale of those distances may be laid out on any part which moves with wedge prism 15, as for instance scale R on slider 46 (Figs. 2a and 2c) the scale being viewable through sight opening 47a through casing 10 and way 47.

Assuming that the cam mechanism has been adjusted longitudinally to a position (relative position between cam 52 and follower roller 51) corresponding to the ascertained distance or elevation, then, assuming that the cam always starts from its zero position (the position in which the lines of sight along axes O, $O_1$ are in a vertical plane) when a selected object is being followed, and that the cam is stopped after it has rotated for the predetermined time, say six seconds; the angular rotation of the cam then directly shows the speed of the instrument along a line at right angles to its optical axis $O_2$, $O_4$.

For reasons which will be explained in connection with the timing mechanism, the zero position of the cam, where cam point 60 registers with the follower and where "zero" of scale 55a is seen in the ocular, is just beyond the position shown in Fig. 2 in the direction of rotation indicated. The backward movement of the cam in resetting is limited in any suitable manner, as by the lug 52a on the disk 55 and stop 52b on the case, indicated in Fig. 2a. The fundamentals of the cam design to accomplish the described results will now be briefly explained.

I have said that the movement of the wedge prism to compensate change in angle between external axes O and $O_1$ bears substantially a reciprocal relation to the corresponding altitude or range changes. That may not be strictly true, particularly for larger angles and shorter ranges, but for the small angles involved in usual aircraft altitudes the simple relation substantially holds.

The direction of prism movement along axis $O_4$ for increase or decrease of the angle between optical axes O and $O_1$—for decrease or increase of altitude—depends on the orientation of prism 15. With the base of the prism in the relative position shown in Fig. 1, the prism moves toward the right, away from objective 12, to compensate for decreasing ranges and increasing angles. With the prism oppositely oriented across axis $O_4$, the relative prism movement is in the opposite direction. For any chosen orientation of the wedge prism, adjusting prisms 16 are set compensatorily.

Choosing the arrangement as shown, some position of prism 15 to the left is the "infinity" position. In some such position as that illustrated the half-images at focal plane I are put in coincidence for relatively great finite altitures, say 20,000 feet (so indicated on Fig. 1) and cam follower roller 51 engages cam 52 in the plane indicated 20,000 feet near the smaller end of the cam. Other positions of the wedge prism and cam mechanism for progressively lower altitudes are indicated, the cam follower rolling on progressively larger (radially larger) parts of the cam for decreasing altitudes.

Figure 7:
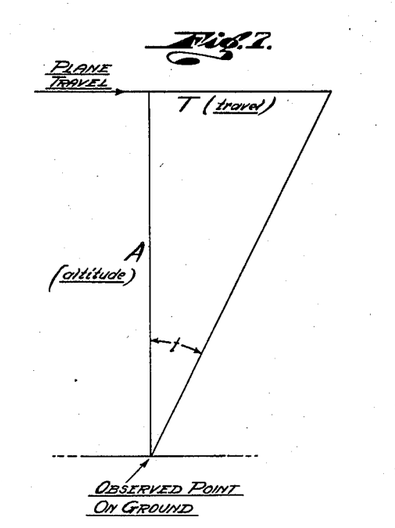
Figs. 7 and 8 are diagrams illustrating certain geometric features which are concerned in the design of the operating cam.

Referring now to the diagram of Fig. 7, we will suppose that the plane is travelling along the horizontal line designated "plane travel," maintaining as nearly as possible a horizontal position. Assume also, for simplicity of description, that there is no windage so that axes $O_2$—$O_4$ of the instrument are at right angles to the line of travel. With the index disk 55 and the cam set at zero position, the optical axes O, $O_1$ (the lines of sight to the ground) are in a vertical plane transverse of the line of travel. Let the line A in Fig. 7 represent that plane; the line A also represents the ground altitude of the air-craft, which has been ascertained by converging the axes O, $O_1$ on a common object. Let the other leg T of the right angled triangle represent the travel of the plane during the selected time period (six seconds) from the time the observer begins to follow the "observed point on the ground" at the instant that observed point passes directly beneath. Then, seeing that the time period is a constant, $$T = \text{speed of travel}$$

In the triangle, angle $t$ is the angle through which axes O, $O_1$ have been revolved in following the observed point; also the angle through which cam follower arm 50 has been revolved. In the triangle of Fig. 7, $$\tan t = \frac{T}{A}$$

If A is assumed constant—that is, for any given altitude—

(1) $\tan t = T$ (assuming the given altitude to be unity). If T (speed) is assumed constant, and unity, then, (2) $$\tan t = \frac{1}{A}$$

Thus tan $t$ varies directly as T and inversely (reciprocally) with A; and for any given altitude A the line of sight is swung through an angle whose tangent is T; while for any given speed T the line of sight is swung through an angle whose tangent is 1/A. It is the function of the cam mechanism to swing the cam follower arm, and the line of sight, through such angles.

Figure 8:
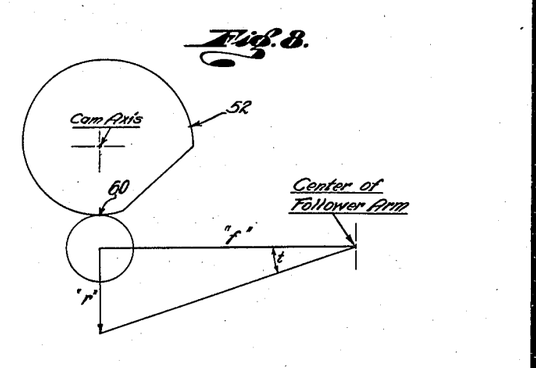

In Fig. 8 the cam axis and the swinging center of the cam follower arm are diagrammatically indicated and labeled. The length of the cam follower from its center to its point of cam engagement in the zero position of the cam is represented by the line $f$. The increase in radius of the cam to the point of contact as the cam revolves is represented by $r$.

In the diagram, $$\text{angle } t = \tan^{-1}\left(\frac{r}{f}\right)$$

or (3) $$= \tan^{-1}(r)$$

if the constant $f$ be considered unity. Angle $t$ in Fig. 8—the angle through which the follower arm is swung—being the same as angle $t$ in Fig. 7—the angle through which the line of sight is swung, it follows from Identities 1, 2 and 3 that $r$ varies in direct relation with T (speed of travel) and with 1/A (reciprocal of the altitude). In the physical design of the cam, its radius varies both circumferentially and longitudinally; circumferentially for plane speed T, and longitudinally for altitude A. Thus, because the longitudinal altitude compensating adjustment of wedge prism 15 and of the cam mechanism is reciprocally proportional to the altitude, the longitudinal surface lines of the cam work out to be substantially straight lines; while the spiral outline of the cam in any radial plane is a spiral of uniformly increasing radius.

The physical dimensions of the cam depend on the range of altitudes it is desired to accommodate, and the distance wedge prism 15 is moved to compensate those altitudes; and also upon the radial distance through which the end of the follower arm 50 has to be moved in order to swing prisms 11, 11a through a given angle (in this particular design this is controlled by the length of the follower arm), and also upon the range of speeds which are to be measured and indicated. But in any case, with the cam design as has been described, the speed index calibration on the index disk 55 is linear.

The foregoing considerations lead to the development of a cam which, as stated, involves spirals of uniform radial increase and also involves straight lines in its surface in axial directions. That is the preferred form of cam, but my invention is not limited to that particular form of element or mechanism for range compensation and speed determination. As will be readily understood, the described cam performs its function because it has a surface warped in two dimensions and, for any given combination of altitude and speed there is one unique point on the surface which corresponds. Relative movement of the cam surface in one of the dimensions adjusts the instrument for altitude, in the other dimension for speed.

With these considerations in mind, my invention in its broader aspects is not necessarily limited to a cam mechanism which has rotation for one of its movements; nor is it necessarily limited to a cam mechanism. Broadly speaking any suitable actuating or compensating mechanism may be used which has two movements, one in altitude compensation the other in speed. And the movements in altitude compensation, and consequently the shape of the surface in which movement occurs in altitude compensation, will of course depend upon the character of movement that is inherent in the altitude compensation of the range finding instrumentation. In my particular design, the use of the compensating wedge prism gives movements which lead to a very simple and easily made cam design.

Figure 2B:
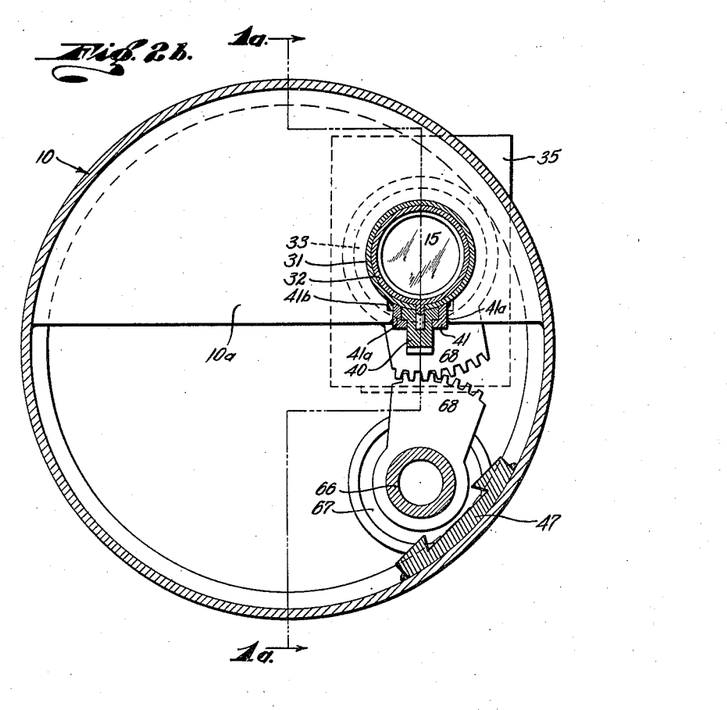
Fig. 2b is an enlarged section on line 2b—2b of Fig. 1.
Figure 2C:
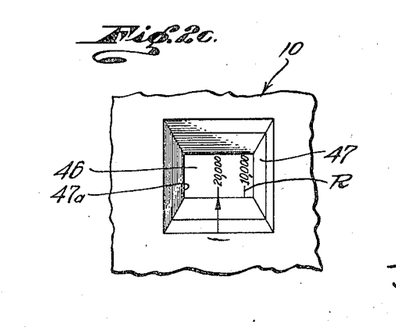
Figure 6:
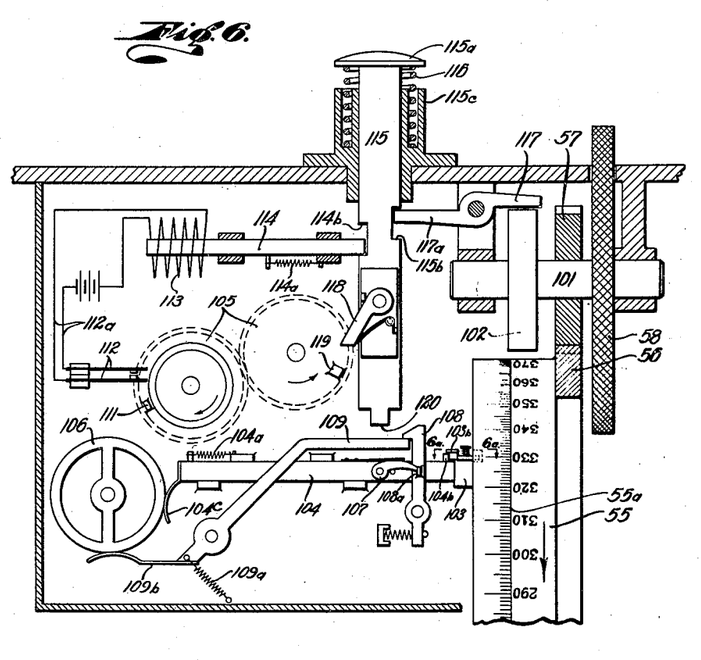
Fig. 6 is a diagrammatic view in the aspect of line 6—6 on Fig. 2a, showing the timing and setting mechanism.
Figure 6A:
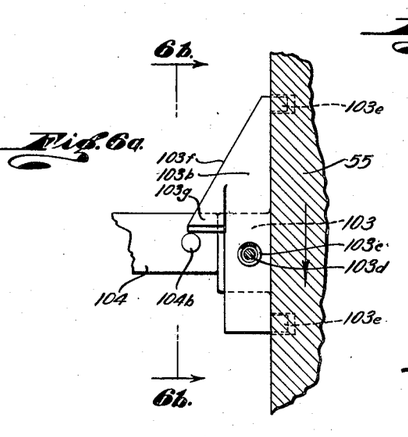
Fig. 6a is an enlarged detail section on line 6a—6a of Fig. 6.
Figure 6B:
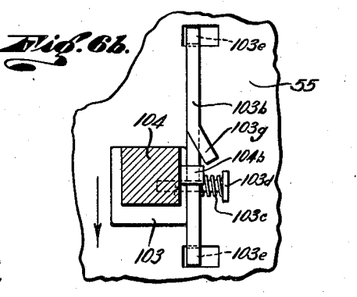

The setting and timing mechanism, which may be enclosed within such a casing as is illustrated at 100 in Fig. 2a is shown diagrammatically in Figs. 6, 6a and 6b. In Fig. 6 the indexed disk 55 is again shown, together with the knurled thumb wheel 58 by which disk 55 is rotated through the gears 56, 57. The general function of the setting and timing mechanism is to allow disk 55 and cam 52 to be rotated for the selected length of time; and to reset the disk and cam to the starting position after each operation.

A brake disk 102 is mounted on shaft 101 of the knurled wheel 58 so as to rotate therewith. The indexed disk 55 is provided with a lug or boss 103 and in the normal starting position of disk 55 a slider 104 bears against lug 103 and is thus held to the left in Fig. 6 against the action of a spring 104a. The numeral 105 designates a pair of gears in a watch or clock movement, and numeral 106 the balance wheel of that movement. The pallet, and other gearings and parts of the movement are not shown but will be understood. Gears 105 may preferably be gears having an even ratio of rotation relative to each other and located at such a place in the movement train that they make a fair fraction of a revolution in the selected time of six seconds.

When disk 55 starts to move from its normal position lug 103 then moves from under slider 104 (in the direction indicated in Fig. 6a) allowing that slider to move quickly to the right in Fig. 6. This release and movement of slider 104 occur substantially just as the zero point 60 on the cam registers with the cam follower, and also as the zero of scale 55a registers in the field of view of the ocular. Slider 104 carries a pawl 107 which, in that movement of the slider, pushes a catch 108 off the end of a pivoted brake lever 109 and allows that lever to be swung counter-clockwise (Fig. 6) by a spring 109a. Pawl 107 pushes against a flat faced lug 108a on pivoted catch 108, and when the catch and lug are tilted back pawl 107 finally slips off the tilted face of the lug and allows the lug to move back under it; so that catch 108 is then in position to re-engage and hold brake lever 109 when it is subsequently re-set in the position of Fig. 6 before the slider 104 is reset. The movement of slider 104 toward the right, and the release of arm 109, removes the brake springs 104c and 105b from engagement with balance wheel 106, allowing the balance wheel immediately to begin movement and to set the whole clock mechanism in movement.

At the end of the selected time of six seconds a lug 111 on one of the gears 105 engages one of a pair of switch contacts 112 to close those contacts and thus close the circuit 112a which controls a solenoid 113. The solenoid is energized on closure of switch 112 and moves its armature bar 114 to the left against the action of spring 114a, to remove the nose of the bar from notch 114b in setting plunger 115. Setting plunger 115 is then immediately moved up by its spring 116, and the upward movement of the setting plunger forcibly applies a brake arm 117 to the brake disk 102. Brake arm 117 forms part of a pivoted lever, the other arm of which, 117a, engages notch 115b in setting plunger 115. With proper adjustments of the parts the timing mechanism thus causes positive and forcible stoppage of index disk 55 and cam 52 at the expiry of the selected time period after the time when the disk and cam were first started in rotation from the zero position, during the operation of following the selected object on the ground. Disk 55 is then held stationary while the operator reads the indicated speed and until the mechanism is reset.

The resetting operation involves merely the manual depression of setting plunger 115 and the return of indexed disk 55 to its starting position. When the setting plunger 115 is pressed down again to and past the position shown in Fig. 6, a pawl 118 engages lug 119 on one of the gears 105 and moves that gear in backward rotation about its shaft, and also moves the other gear 105 in backward rotation about its shaft by the same amount. To facilitate this operation the two gears 105 are frictionally mounted on their shafts. The positions to which these two gears are thus backed up in resetting the device is controlled by a stop or stops which limit the depression of setting plunger 115. The notch 114b in which the solenoid armature 114 engages provides for a limited amount of free movement of the plunger below the position to which the solenoid bar holds the plunger down; and the upper end of that notch may form the stop limiting the manual depression of the resetting plunger. Or the limiting stop for the resetting plunger may be formed by the engagement of its head 115a with the member 115c which houses spring 116. Depression of the setting plunger thus rotates gears 105 back to their correct starting position; a position in which the lug 111 is removed from switch 112 by just the correct time angle to close that switch after the selected time period upon the next operation of the instrument.

At the same time that the depression of plunger 115 resets the clock mechanism, its lower end 120 engages the brake lever 109 to push it down so that its end is again locked down by catch 108. This action resets brake 109b on balance wheel 106 to hold that wheel from starting rotation when the plunger 115 is allowed to move back to the position of Fig. 6. Brake arm 117 has also been raised from brake disk 102 by the depression of plunger 115, and the solenoid bar 114 has again entered notch 114b under the action of spring 114a. Then when plunger 115 is subsequently released to move up under the action of its spring 116, bar 114 limits the upward movement to the position shown in Fig. 6. In this position brake arm 117 is still not applied to brake disk 102; the application of that brake arm requires the further upward movement of plunger 115 which only takes place when solenoid bar 114 is withdrawn when switch 112 is closed on the subsequent operation of the mechanism. Finally, when the index disk 55 and cam 52 are returned to normal position by rotation opposite to that indicated by the arrows, slider 104 is reset in the position of Fig. 6. The whole instrument is then in its initial position ready for subsequent operation. The direction of rotation of cam 52 during the timed operation of the instrument is indicated by the directional arrow in Figs. 1 and 2. The corresponding direction of rotation of the index disk is shown in Fig. 6. The resetting of the index disk is accomplished by backward movement of the disk and stop 52a, 52b limits the movement to its proper zero position.

A suitable arrangement which allows slider 104 to snap off lug 103 on forward rotation of the index disk, and raises it to finally rest on lug 103 when the disk is reset, is shown in Figs. 6, 6a and 6b. Slider 104 has a laterally projecting pin 104b near its end. A cam plate 103b lies alongside lug 103, normally pressed against the side of the lug by a spring 103c which surrounds a pin 103d which passes loosely through the cam plate and is secured in lug 103. The cam plate base rests against the face of disk 55 and has small lugs 103e at its ends loosely entering depressions in the disk 55 to generally locate the cam plate, but allowing it to be pushed to the right in Fig. 6b.

As viewed in Fig. 6a, the cam plate has a camming edge 103f up which pin 104b rides when disk 55 is reset. Near the top of that edge 103f there is a laterally bent lug 103g. In the resetting operation pin 104b finally drops over lug 103g to allow slider 104 to be seated on lug 103 in the position of Figs. 6 and 6a. On subsequent forward rotation of disk 55 the diagonal lug 103g engages pin 104b and cam plate 103b is pushed to the right in Fig. 6b, allowing slider 104 to drop sharply off the edge of lug 103. When rotation has carried cam plate 103b past pin 104b, the cam plate resumes the position shown in Fig. 6b ready to lift pin 104b and replace slider 104 on lug 103 on the next resetting operation.

I claim:

1. In instruments for measuring relative displacement of a distant object across the line of sight to the object and which include range finding instrumentation with a movable range compensating element whose different positions correspond to different ranges and whose movement bears a reciprocal relation to the indicated range, and means by which a line of sight to the object may be angularly displaced through an angle corresponding to the displacement of the object across the line of sight; the improvement which is characterized by the combination of a cam mechanism including a cam and cam follower having relative movements in two planes, the cam actuated movements of the follower having a linear relation to each of the relative cam-and-follower movements, connective means between the range compensating element and the cam mechanism causing relative movement of the cam and follower in one of the two planes in linear relation to the movement of the range compensating element, and connective means which transmits the relative movement of the cam mechanism in the other of its planes of movement to the means for angularly shifting the line of sight.

2. Improvements as specified in claim 1, further characterized by timing means applied to the second mentioned relative movement of the cam mechanism.

3. Improvements as specified in claim 1, further characterized by the second mentioned connective means being one which transmits to the angular shifting means an angular movement whose tangent bears a linear relation to the second mentioned relative movement of the cam mechanism.

4. Improvements as specified in claim 1, further characterized by the second mentioned connective means being one which transmits to the angular shifting means an angular movement whose tangent bears a linear relation to the second mentioned relative movement of the cam mechanism, and timing means applied to the second mentioned relative movement of the cam mechanism.

5. In instruments for measuring relative displacement of a distant object across the line of sight to the object and which include range finding instrumentation with a movable range compensating element whose different positions correspond to different ranges and whose movement bears a reciprocal relation to the indicated range, and means by which a line of sight to the object may be angularly displaced through an angle corresponding to the displacement of the object across the line of sight; the improvement which is characterized by the combination of a cam mechanism including rotatable cam whose cam surface comprises a plurality of equally-axially-spaced spirals each of uniform radial increment, the radial increment of the several spirals increasing uniformly in one axial direction along the cam, a cam follower, the cam and follower having relative constrained movements in directions axial and radial of the cam, a swingingly pivoted cam follower arm actuated by the relative radial movements of the cam follower, connective means between the range compensating element and the cam mechanism to cause relative axial adjustment movement of the cam and cam follower in linear relation to the movement of the range compensating element, and connective means which transmits the swinging movement of the cam follower arm in linear relation to the means for angularly shifting the line of sight.

6. Improvements as specified in claim 5, further characterized by the first mentioned connective means being connected directly to the swinging follower arm and follower to move them axially of the cam, the cam being relatively stationary as regards axial movement but rotatable about its axis.

7. Improvements as specified in claim 5, further characterized by the first mentioned connective means being connected directly to the swinging follower arm and follower to move them axially of the cam, the cam being relatively stationary as regards axial movement but rotatable about its axis, a circumferentially extending scale directly rotatable with the cam, and timing means set in operation by inception of rotation of the cam and scale and acting to stop said rotation at the end of a predetermined time period.

8. In instruments for measuring relative displacement of a distant object across the line of sight to the object and which include a relatively stationary frame, parallactically spaced reflective surfaces, at least one of which is carried on a rotative carrier in the frame, so that at least one of the reflective surfaces may be rotated about an axis parallel to their direction of spacing, optical means for forming a pair of parallactic images in a common field, and a wedge prism movable along the optical axis of the optical means to cause the two images to coincide; the improvements which are characterized by the combination of, a cam mounted in the frame for rotation about an axis parallel to the rotation axis of the reflector carrier, the cam comprising a plurality of equally-axially-spaced spirals each of uniform radical increment, the radical increment of the several spirals increasing uniformly in one axial direction along the cam, so that the line which defines the intersection of the cam surface with any plane passing through the cam axis is a straight line, a way on the frame parallel to the cam axis, a slider in the way, a cam follower arm swingingly pivoted on and carried by the slider so as to move axially with it, a cam follower connected to the arm and constrained to movements axially with the arm and radially of the cam, connective means transmitting motion in linear relation between the slider and the wedge prism in linear relation, and connective means transmitting swinging motion in linear relation between the follower arm and the rotative reflector carrier.

9. Improvements as specified in claim 8, further characterized by a circumferentially extending scale directly rotatable with the cam, and timing means set in operation by inception of rotation of the cam and scale and acting to stop said rotation at the end of a predetermined time period.

10. In instruments for measuring relative displacement of a distant object across the line of sight to the object and which include range finding instrumentation with a movable range compensating element whose different positions correspond to different ranges, and means by which a line of sight to the object may be angularly displaced through an angle corresponding to the displacement of the object across the line of sight; the improvements which are characterized by the combination of, a manually rotatable cam having a warped cam surface, a cam follower movable both axially and radially of the cam, connective means corelating the movements of the range compensating element and the axial movements of the cam follower, connective means corelating the angular displacement of the line of sight and the radial movements of the cam follower, a circumferentially extending scale directly associated with and rotatable with the cam, and timing means limiting the rotation of the cam to a predetermined time period.

11. Improvements as specified in claim 10, further characterized by the timing means being set into operation by inception of rotation of the cam and acting to stop cam rotation at the end of the predetermined time period.

12. In instruments for measuring relative displacement of a distant object across the line of sight to the object and which include a relatively stationary frame, spaced reflective surfaces carried on rotative carriers in the frame so that the spaced reflective surfaces may be rotated about an axis parallel to their direction of spacing, optical means for forming a pair of parallactic images in a common field, an ocular for viewing that field, and a wedge prism movable along the optical axis of the optical means to cause the two images to coincide; the improvements which are characterized by the combination of a warped surface cam mounted in the frame for rotation about an axis parallel to the rotation axis of the reflector carriers, a circumferentially extending scale mounted to rotate directly with the cam, optical means throwing an image of the scale into the common field viewed by the ocular, a shaft rotatively mounted in the frame parallel to the rotation axis of the reflector carriers, a way on the frame parallel to said last mentioned axis and shaft, a slider in the way, connective means corelating the movements of the slider in the way and the movements of the wedge prism along the optical axis, a cam follower arm splined on said shaft and carried by the slider so as to move axially with it, a cam follower connected to the arm to move axially with it and to transmit swinging motion to the arm by virtue of axial movement of the follower along the warped cam surface or by virute of cam rotation, and gearing connection between said shaft and the reflector carriers.

13. Improvements as specified in claim 12, further characterized by the slider carrying a bracket, the cam follower slidably mounted in said bracket to move therein radially of the cam, and the cam follower being connected to the arm by connective engagement which allows relative movement in a direction radial of the arm.

GEORGE A. MITCHELL.